Dec. 26, 1967  L. O. VARGADY  3,360,306
SLIDE BEARING ASSEMBLY
Filed March 11, 1965
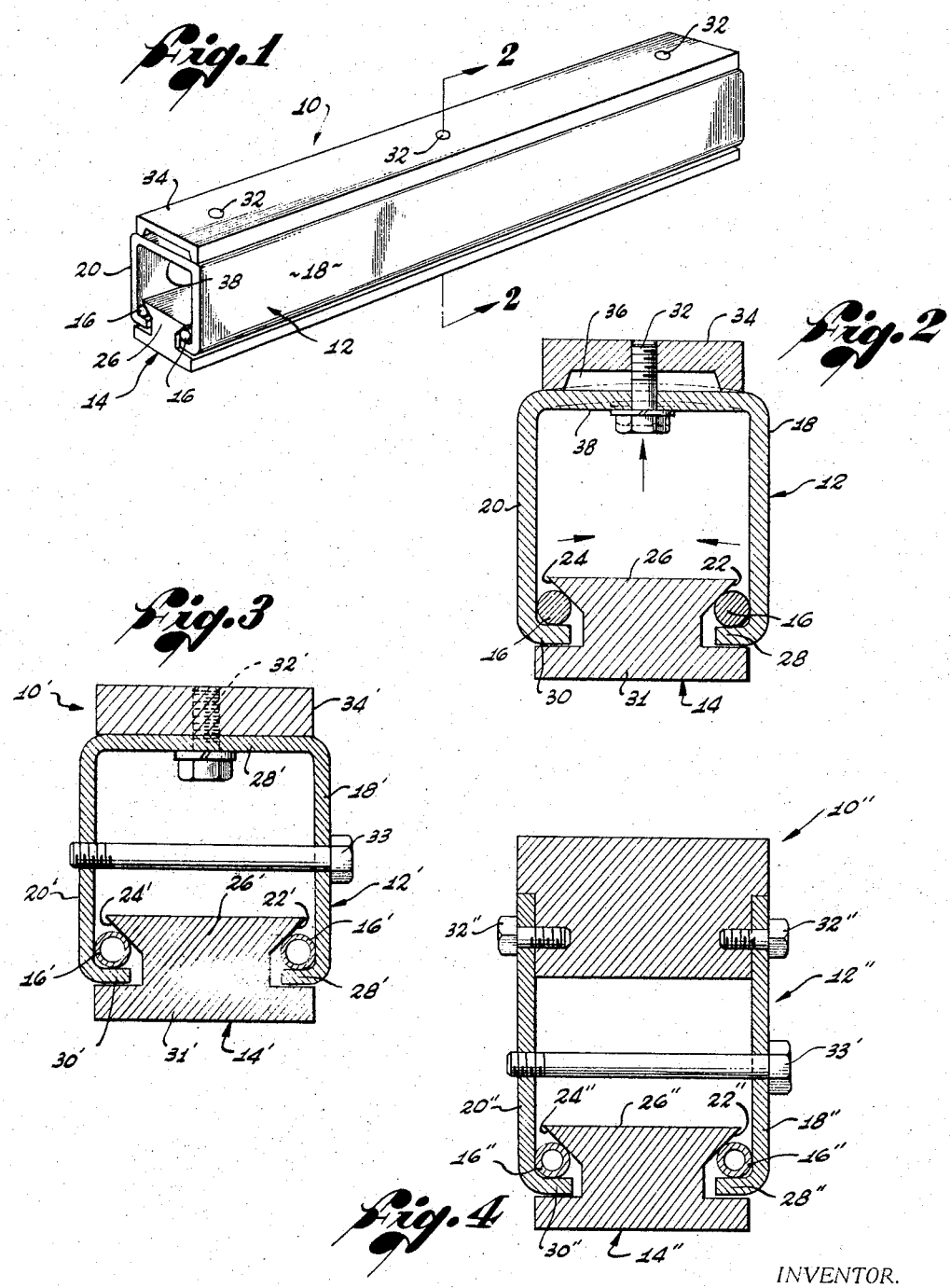
INVENTOR.
LESLIE O. VARGADY
BY Forrest J. Lilly
ATTORNEY United States Patent Office 3,360,306
Patented Dec. 26, 1967

3,360,306
SLIDE BEARING ASSEMBLY
Leslie O. Vargady, Covina, Calif., assignor to Davidson Optronics, Inc., West Covina, Calif., a corporation of California
Filed Mar. 11, 1965, Ser. No. 438,845
2 Claims. (Cl. 308—3)

ABSTRACT OF THE DISCLOSURE

A simply and inexpensively constructed slide bearing assembly for a precision instrument, such as the focusing slide for a microscope, embodying a channel with resilient sides slidably engaging a pair of cylindrical guide rods, each rod being trapped between a channel side wall and a dovetail surface on a dovetail slide which is movable longitudinally in the channel, with provision by which the channel may be elastically deformed uniformly along its length to increase or decrease the pressure of the side walls against the guide rods and the dovetail surfaces of the slide.

---

The present invention relates to improvements in apparatus supporting slide members for rectilinear movement and, more particularly, to a novel slide bearing assembly.

Precision slide mechanisms capable of smooth, rectilinear movement are commonly found and usefully employed in various optical as well as other scientific measuring instruments. The focusing slide of a microscope is but one example. Although such precision slide mechanisms vary in construction detail, they generally include some sort of ball bearing assembly to provide the desired smooth, rectilinear movement for a movable slide. Usually, this ball bearing assembly includes a plurality of balls captured between aligned races in the sides of the slide and a stationary housing or support frame.

To insure smooth, precision rectilinear movement for the slide, it is necessary that the ball bearings be of a uniform diameter and that the surfaces of the supporting races be smooth and free from foreign matter. Therefore, extreme care is taken in the manufacture, grinding and finishing of the ball bearing assemblies. Unfortunately, however, such painstaking effort is time consuming and requires special machines as well as skilled machinists. Accordingly, conventional bearing assemblies for precision slide mechanisms are relatively expensive.

Further, such ball bearing assemblies require periodic servicing to insure that foreign matter does not become embedded between the ball bearings and the supporting races and thereby interfere with the smooth operation of the slide mechanism.

Also, in practice, relatively great pressures are developed between the ball bearings and their supporting races. This causes the ball bearings to wear rather rapidly with use, in turn, causing the associated slide mechanisms to lose their precision alignment and sliding accuracy.

In view of the foregoing shortcomings of conventional ball bearing assemblies, it is an object of the present invention to provide an improved precision rectilinear slide bearing assembly which is simple in design and relatively inexpensive to manufacture.

Another object of this invention is to provide a relatively trouble-free, long lasting, precision slide bearing assembly.

A further and more specific object of the present invention is to provide a rectilinear slide bearing assembly which is adjustable to compensate for any surface irregularities in its slide or bearing housing, thereby insuring precision rectilinear sliding movement for the slide while allowing the assembly to utilize relatively inexpensive components which are easily assembled.

Still another object of this invention is to provide a precision slide bearing assembly of the foregoing adjustable type which is simple and compact in design and long lasting and durable in operation.

The foregoing as well as other objects and advantages of this invention may be more clearly understood by reference to the following detailed description taken with the drawing which, by way of example only, illustrates particular forms of slide bearing assemblies embodying the features of this invention.

In the drawing:

FIG. 1 is a perspective view of one form of slide bearing assembly embodying the features of this invention;

FIG. 2 is a cross-sectional view taken along the line 2—2 in FIG. 1 showing the inner construction of the slide bearing assembly;

FIG. 3 is a sectional view similar to FIG. 2 of another form of a slide bearing assembly; and FIG. 4 is a sectional view also similar to FIG. 2 of still another form of the slide bearing assembly.

In the drawing, the illustrated form of the slide bearing assembly is represented generally by the numeral 10 and includes a thin-wall, stationary channel 12, a movable slide 14, and a pair of straight, smooth cylindrical rods 16. The rods support the slide for smooth, longitudinal, sliding movement along the channel and to this end are trapped between flat, opposing sides 18 and 20 of the channel and outwardly flaring or beveled surfaces 22 and 24 of a dovetail portion 26 of the slide.

More particularly, the lower edges of the sides 18 and 20 carry inwardly extending lips or flanges 28 and 30. The lips engage and make sliding contact with horizontal top surfaces of a base 31 of the slide along opposite sides of the dovetail portion 26. The rods 16, in turn, rest upon the lips while making tangential contact with the sides of the channel and the flaring surfaces 22 and 24 of the slide. Because of the double contact between the rods and the sides of the channel, both along the lips and the sides, greater friction forces are developed between the rods and the channel than between the rods and the slide. Therefore, as the slide 14 is moved longitudinally relative to the channel 12, the rods 16 remain stationary with the channel and the dovetail surfaces of the slide glide over the rods along and in line with the channel. In this manner, the rods act as guides as well as linear bearing surfaces for the slide within the channel.

In order that the movement of slide 14 over the rods 16 not only be linear but smooth, it is important that the rods be parallel to each other and that uniform friction forces exist between each of the rods and the slide. To achieve this while allowing the use of relatively inexpensive, rough components, the present invention provides means for selectively controlling and adjusting the spacing of the sides 18 and 20 of the channel, and hence the pressure exerted on the rods 16 against the flaring sides 22 and 24 of the slide. In this regard, the channel 12 is slightly flexible, and is resiliently deformable to vary the distance between the opposing sides 18 and 20.

In the form of the invention illustrated in FIG. 1, the means for deforming the channel includes a plurality of screws 32 and a flat backing plate 34 having an elongated recess 36 in its lower surface. The screws 32 pass upwardly through the flat base 38 of the channel and the recess 36 into the backing plate, thereby connecting the base of the channel to the backing plate over the recess. As represented by the dotted outline in FIG. 2, a tightening of the screws 32 against the base 38 of the channel causes the base to elastically deform upwardly into the recess. This, in turn, causes the sides of the channel to bend or be displaced inwardly and more firmly engage and press against the rods 16.

Thus, by selectively tightening and loosening the screws 36, the spacing of the sides 18 and 20 of the channel can be controlled to insure parallel alignment of the rods 16 and to maintain a controlled, uniform pressure on each of the rods against the dovetail surfaces of the slide. In this manner a controlled, uniform sliding friction can be developed between the rods and slide to insure smooth, linear sliding movement of the slide relative to the stationary channel. Furthermore, by selectively tightening and loosening the screws, it is possible to maintain the uniform pressure on the rods and hence the uniform sliding friction despite minor surface irregularities in the rods, slide, and/or channel. The screws 32 and backing plate 34 will be seen to comprise a means for variably displacing the sides of the channel for the purpose described.

Accordingly, the slide bearing assembly 10 provides for precision rectilinear movement of the slide 12 while employing a simple design of a minimal number of components which, due to the adjustable nature of the assembly, may be of an inexpensive, somewhat rough, construction. Furthermore, due to the simplicity of its design, the slide bearing assembly 10 is inexpensive to manufacture and is easily assembled and disassembled for servicing and replacements of parts as needed. In this regard, however, it should be noted that the slide bearing assembly 10 is extremely rugged in design and has proven to be durable, long lasting and trouble free.

An alternative form of the slide bearing assembly possessing the foregoing features and advantages is illustrated in FIG. 3 and represented generally by the numeral 10'. The slide bearing assembly 10' has the additional advantage, however, that its means for adjusting the distance between the sides of the channel is more readily accessible than that of FIGS. 1 and 2. More particularly, in the slide bearing assembly 10', the backing plate 34' has a flat bottom surface carrying the base 38' of the channel 12'. Screws 33 pass in a horizontal direction through the side 18' and screw into the side 20' of the channel with the heads of the screws engaging the outside of the side 18'. A turning of the screws 33, therefore, causes the sides 18' and 20' to move inwardly or outwardly relative to each other, depending upon the direction of rotation of the screws.

Accordingly, as in the slide bearing assembly 10, the distance between the opposing sides of the channel 12' can be selectively controlled to maintain parallel alignment of the rods 16' and the uniform sliding friction between the rods and the slide 14', thereby insuring smooth linear sliding movement of the slide within the channel. Furthermore, by selective adjustment of the screws 33, uniform friction forces can be maintained between the slide and the rods despite minor irregularities in the surfaces of the rods, slide and/or channel.

In addition, in the slide bearing assembly 10', the rods 16' are illustrated as being tubular, rather than solid as in FIGS. 1 and 2. Being tubular, the rods 16' are slightly resilient and deformable to further compensate for any irregularities in the slide 14' upon a tightening of the sides of the channel 12' against the rods.

Still another form of slide bearing assembly embodying the features of the present invention is illustrated in cross section in FIG. 4, and represented generally by the numeral 10". As represented, the slide bearing assembly 10" includes the same horizontal screw arrangement and the tubular rod construction as FIG. 3. In the bearing assembly 10", however, the channel 12" is formed of separate members including the flat bottom of the backing plate 34" and a pair of flat vertical arms 18" and 20" extending downwardly from the sides of the backing plate. The lower edges of the arms carry inwardly extending lips 28" and 30" which, together with the arms, provide longitudinal support for a pair of tubular plastic rods 16", in the same manner as previously described in connection with FIGS. 1 and 2.

Therefore, as in FIG. 3, a tightening or loosening of the screws 33' causes the arms 18" and 20" to bend inwardly or outwardly relative to each other, thereby controlling the parallel alignment of the rods 16" and the pressure on the rods against the dovetail surfaces of the slide 14". In this manner, the friction forces on the slide 14" can be accurately controlled to insure its smooth linear sliding movement within the channel 12".

From the foregoing, it is appreciated that the present invention provides a precision slide bearing assembly which is extremely simple in design and includes a minimal number of parts which are readily assembled, thereby making manufacture of the assembly relatively inexpensive. Furthermore, the adjustable feature of the bearing assembly allows the assembly to utilize inexpensive components to further decrease the resultant cost of the assembly to the consumer.

In the foregoing, preferred forms of the invention have been described in some detail. Changes and modifications, of course, may occur to those skilled in the art without departing from the spirit of this invention. Therefore, it is intended that the present invention be limited in scope only by the following claims.

I claim:

1. A slide bearing assembly comprising:
   a resiliently deformable channel having a base and opposing sides with inwardly turned lips along the marginal edges thereof;
   a slide having a dovetail portion stationed within said channel between said opposing sides;
   a pair of straight, cylindrical rods each trapped between a dovetail surface of said slide and a side and lip of said channel to mount said slide for longitudinal sliding movement relative to said channel;
   a backing plate substantially longitudinally coextensive with said channel having a correspondingly longitudinally extended recess in one of its sides; and
   means connecting said base of said channel to said backing plate over said recess including a plurality of screws connected to a plurality of longitudinally spaced center points of said base and passing through said recess into said backing plate such that tightening of said screw resiliently deforms said base of said channel into a transverse curve and thereby displaces said opposing sides inwardly toward each other thereby varying the pressure on said rods against said dovetail surfaces of said slide.

2. A slide bearing assembly comprising:
   a resiliently deformable channel having a base, opposed side walls extending from said base, and inturned lips along the marginal edges of said side walls;
   a slide having a dovetail portion stationed within said channel between said side walls;
   a pair of bearing rods each trapped between a single dovetail surface of said slide and a side wall and lip of said channel, along three lines of contact; and
   means for resiliently deforming said channel into configurations with said opposing side walls at different distances from one another.

(References on following page)

References Cited

UNITED STATES PATENTS

| | | | | |
|---|---|---|---|---|
| 1,004,140 | 9/1911 | Bonney | | 16—88 |
| 2,261,504 | 11/1941 | Saunders | | 308—3.8 |
| 2,307,305 | 1/1943 | Saunders | | 308—3.8 |
| 2,318,572 | 5/1943 | Cramer | | 308—6 X |
| 2,780,501 | 2/1957 | Rosenberg | | 308—6 |
| 2,789,675 | 4/1957 | Gebauer | | 308—3 X |
| 3,044,104 | 7/1962 | Walz | | 16—94 X |
| 3,143,758 | 8/1964 | Dunham | | 16—88 |
| 3,220,091 | 11/1965 | Reef | | 308—3.8 X |
| 3,226,830 | 1/1966 | Everitt | | 308—6 |

FOREIGN PATENTS

| | | |
|---|---|---|
| 719,236 | 3/1942 | Germany. |
| 1,077,544 | 3/1960 | Germany. |
| 909,336 | 10/1962 | Great Britain. |
| 278,809 | 11/1930 | Italy. |

MARTIN P. SCHWADRON, *Primary Examiner.*

L. L. JOHNSON, *Assistant Examiner.*